3,840,582
PROCESS OF PURIFYING DIAMINOMALEO-NITRILE

Tomio Okada, Yamato, Japan, assignor to Sagami Chemical Research Center, Tokyo, Japan
No Drawing. Filed Sept. 7, 1972, Ser. No. 286,921
Int. Cl. C07c 121/20
U.S. Cl. 260—465.5 R                          4 Claims

ABSTRACT OF THE DISCLOSURE

A process of purifying crude diaminomaleonitrile, comprising adding a hydrogen halide to the solution of crude diaminomaleonitrile in a first solvent to form an addition salt of diaminomaleonitrile and hydrogen halide thereby allowing the formed addition salt to precipitate from the first solvent, separating the addition salt from the first solvent by filtration, adding a basic substance to a solution of the separated addition salt in a second solvent to neutralize the solution, thereby precipitating free diaminomaleonitrile from the second solvent, and then separating and recovering the diaminomaleonitrile precipitated.

---

This invention relates to a novel process by purifying crude diaminomaleonitrile obtained by tetramerizing hydrogen cyanide or by reacting hydrogen cyanide with cyanogen.

It has been well known that diaminomaleonitrile plays a very important role as an intermediate for the synthesis of nucleic acids which can be made from hydrogen cyanide. Also, as modern theories teach that diaminomaleonitrile had been an indispensable substance for the creation of life during "the era of life-formation," it is a very important compound as a raw material for synthesizing various amino acids and purines.

By the hydrolysis of diaminomaleonitrile, glycine which is useful as a food additive or in medicines can be easily obtained in relatively high yield.

Also, diaminomaleonitrile can be isomerized by photochemical reaction to form 4,(5)-cyano-5,(4)-aminoimidazole, and by hydrolysis of the latter, 4-aminoimidazole-5-carboxyamide is obtained. This carboxyamide is used in culturing microorganisms. Further, 4,(5)-cyano-5,(4)-aminoimidazole can be reacted with hydrogen cyanide to form adenine which is also used in culturing microorganisms. Also, the compound 4-aminoimidazole-5-carboxyamide can be reacted with KCNO to form xanthine, and the methyl derivatives of xanthine are used in medicines as caffeine, theophylline and theobromine. When 4-aminoimidazole-5-carboxyamide is reacted with hydrogen cyanide, hypoxanthine is obtained, and hypoxanthine, is indispensable as a raw material for synthesis of inosinic acid which is a condiment. And also, the compound 4-aminoimidazole-5-carboxyamide can be reacted with cyanogen to obtain guainine which is a fundamental material of nucleic acid. Thus, diaminomaleonitrile has many uses, and is a very important material from an industrial viewpoint. However, the production of the above-mentioned compounds has not yet been carried out on a large scale, because no way had been developed for the synthesizing of diaminomaleonitrile on a commercial scale. About ten processes for preparing diaminomaleonitrile have been disclosed up to the present time. However, they are only laboratory processes. The only process that can be considered for use on an industrial scale is described in U.S. Pat. No. 2,499,441, Ann, *81*, 600 (1956). This process comprises polymerizing hydrogen cyanide at a temperature within a range of from 0° C. to 100° C. and in the presence of $Al_2O_3$ or $SiO_2$ as a catalyst. However, this process requires a reaction time of from 20 to 24 hours, and, also the yield at best is only 25%. Other methods consist of tetramerizing hydrogen cyanide in a polar solvent using alkali as a catalyst to obtain diaminomaleonitrile in higher yields (about 60%), as filed by the present inventor et al. (Japanese patent application Nos. 35,-044/69 and 62,691/69). By diaminomaleonitrile obtained in either method inevitably contains small amounts of polymers of hydrogen cyanide such as pentamer or hexamer having a higher degree of polymerization than that of tetramer. Accordingly, the product obtained will be colored yellow-brown. Recrystallization of the product with water or lower alcohols leads to some discolorization, which, however, contributes to no apperciable effects. Discolorization by means of activated carbon on the other hand causes the diaminomaleonitrile to be adsorbed on the activated carbon, resulting in decreased purification yield (about 20%); purity of the product obtained ranges from 90 to 92% at best. As an effective purification process, there is a sublimation method according to which the purity can be increased to over 99%, but the yield is very poor as in the case of activated carbon, since part of the diaminomaleonitrile during the process of heating undergoes thermal polymerization or decomposition (purification yield, 30–40%).

The object of this invention is to provide a novel process of purifying diaminomaleonitrile allowing strikingly high yield.

The object of this invention can be achieved by the process comprising, adding a hydrogen halide to a solution of crude diaminomaleonitrile in a first solvent to form an addition salt of diaminomaleonitrile and hydrogen halide thereby allowing the addition salt to precipitate from the first solvent, separating the addition salt from the first solvent by filtration, adding a basic substance to a solution of the separated addition salt in a second solvent to neutralize the solution, thereby precipitating free diaminomaleonitrile from the second solvent, and then separating and recovering the diaminomaleonitrile precipitated.

This invention relates to a process of purifying diaminomaleonitrile, comprising, dissolving colored crude diaminomaleonitrile in an appropriate first solvent such as dimethyl ether, diethyl ether, tetrahydrofuran, or higher alcohols having five or more carbon atoms, adding thereto hydrogen halide such as HCl or HBr in the anhydrous gaseous state or aqueous solution state, separating by means of filtration the formed addition salt which will be insolubilized and then dissolving the separated addition salt in the second solvent such as water or lower alcohol, followed by the addition of a basic substance such as caustic soda or caustic potash within relatively low temperature range (preferably 0°–10° C.) to neutralize the solution, so that white and high-purity diaminomaleonitrile is insolubilized and separated.

The process of this invention is characterized in that the purification yield is remarkably high (96% or more) and the purity is very high as well (97% or more). A particularly preferred embodiment of this invention is the use of anhydrous hydrogen halide gas as the hydrogen halide. According to this method, the purification yield as well as purity can be increased more compared to the instance where hydrogen halide is used in the form of aqueous solution; purification yield can be about 97% or over, and purity in particular can be increased to more than 99% as obtainable with the sublimation method. The object compound of this invention, i.e., diaminomaleonitrile can be used widely in fields of drugs and those where extremely high purity is required. Accordingly, the increase of purity as achieved with this invention is commercially very significant. The reason why the use of anhydrous hydrogen halide gives more increased purification yields and purity than the use of hydrogen halide in the state of aqueous solution, is presumably that a di-addition salt of hydrogen halide might have been formed when anhydrous hydrogen halide is used. Past reports have been made only on the mono-addition salt of hydrogen chloride as an example of hydrogen halide addition salt of diaminomaleonitrile. The fact that di-addition salt is formed predominantly when hydrogen halide is used, was found for the first time by the present inventor. The fact that the di-addition salt of diaminomaleonitrile has a degree of crystallinity higher than that of the mono-addition salt and is easier to precipitate quantitatively from the solvent such as ether was also discovered for the first time by the present inventor.

In the process of this invention, when addition salt of diaminomaleonitrile is being formed using anhydrous hydrogen halide, many of the impurities contained in crude diaminomaleonitrile do not at all form any addition salts, or at best form only mono-addition salts. Diaminomaleonitrile alone lends itself to the formation of di-addition salt. Within an appropriate temperature range, e.g., 0° to to 10° C., di-addition salts of a high crystallinity alone are precipitated selectively, and impurities are excluded out of the system very effectively. Diaminomaleonitrile having an extremely high purity can be obtained by neutralizing the above precipitated di-addition salt with an alkali in a manner as mentioned above.

It was confirmed that the reaction where HCl and NaOH are employed proceeds in the following manner.

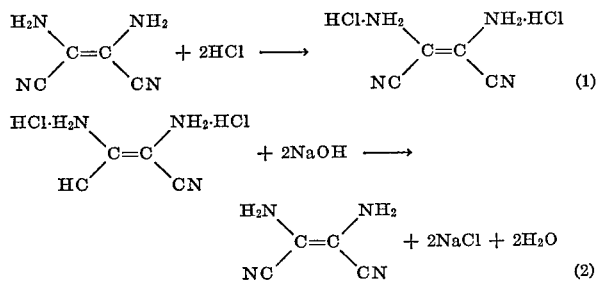

In this case of the use of hydrogen halide in the form of an aqueous solution results in reduced precipitation of crystals as well as reduced purity and purification yield. This tendency is assumed to be greater as the concentration of hydrogen halide in an aqueous solution is decreased.

Of the hydrogen halide used for the process of this invention, HCl is easily and cheaply available as an industrial raw material and is most preferable. Of the basic substances, NaOH and KOH are also available cheaply and in large amounts and are hence preferable. To effectively put the process of this invention into practice, the following requirements should be satisfied. (1) Select the first solvent which allows quantitative insolubilization and separation of addition salts formed from diaminomaleonitrile. (2) Select the second solvent which, after the addition salts of diaminomaleonitrile separated above have fully been dissolved in it, allows quantitative insolubilization and separation of diaminomaleonitrile as a result of the neutralization with alkali. (3) Maintain the temperature within relatively low temperature range, i.e., 0°–10° C., during or after the neutralization, so that it serves as a means for promoting the requirement (2) above. The requirement (3) is effective specifically for reducing the solubility of diaminomaleonitrile. There are several solvents capable of meeting the requirements of (1) and (2) above. The most preferable examples are ether, or higher alcohols having 5 or more carbon atoms as a solvent for requirement (1), and water or lower alcohols having 1 to 3 carbon atoms as a solvent for requirement (2).

Examples of this invention are illustrated below.

EXAMPLE 1

Faintly yellow precipitate (diaminomaleonitrile dihydrochloride) obtained by passing at room temperature anhydrous HCl gas through 200 ml. of diethylether in which has been dissolved 1.0 g. of 85% purity crude diaminomaleonitrile, was separated by filtration, washed 2–3 times with diethylether, and dried. The dried compound was dissolved in about 60 ml. of water, and the resulting solution was neutralized with 1/10 N of NaOH aqueous solution in an ice bath (3°–5° C.) with stirring. The insolubilized and separated diaminomaleonitrile was then washed several times with cold water (3°–5° C.). The weight, purity, and purification yield of diaminomaleonitrile after the drying were 0.83 g., 99.8% and 97.6% respectively.

EXAMPLE 2

1.5 Grams of crude diaminomaleonitrile having a purity of 85% was dissolved in 220 ml. of diethylether. Passing of anhydrous HBr gas through the above solution at room temperature yielded a yellow-white precipitate (diaminomaleonitrile di-bromide). The above yellow-white precipitate was treated in the same manner as in Example 1 except that 1/10 N of KOH aqueous solution was used, and 12.4 g. of purified diaminomaleonitrile was obtained. Purity was 99.2% and purification yield was 96.8%.

EXAMPLE 3

By dissolving 1.0 g. of crude diaminomaleonitrile having a purity of 85% in 200 ml. of diethylether, adding 30 ml. of HCl aqueous solution having a concentration of about 45% thereto, and treating the obtained yellowish precipitate in the same manner as in Example 1 above, 0.84 g. of purified diaminomaleonitrile was obtained. Purity was 97.0% and purification yield was 96%.

What is claimed is:

1. A process of purifying crude diaminomaleonitrile, comprising adding a hydrogen halide selected from hydrogen chloride and hydrogen bromide to the solution of crude diaminomaleonitrile in a first solvent selected from dialkyl ether of from 2 to 5 carbon atoms to form a di-addition salt of diaminomaleonitrile and hydrogen halide thereby allowing said formed di-addition salt to precipitate from said first solvent, separating said di-addition salt from said first solvent by filtration, adding a basic substance selected from NaOH and KOH to a solution of said separated di-addition salt in water as a second solvent to neutralize the solution, thereby precipitating free diaminomaleonitrile from said second solvent, and then separating and recovering said diaminomaleonitrile precipitated, said neutralization being carried out at a temperature of from 0° to 10° C.

2. The process of claim 1 wherein said dialkyl ether is selected from dimethyl ether and diethyl ether.

3. The process of claim 1 wherein said dialkyl ether is diethyl ether.

4. A process of claim 1 wherein said hydrogen halide is an anhydrous hydrogen halide.

References Cited
UNITED STATES PATENTS
3,701,797   10/1972   Okada et al. ____ 260—465.5 R JOSEPH PAUL BRUST, Primary Examiner

UNITED STATES PATENT OFFICE
CERTIFICATE OF CORRECTION

Patent No. 3,840,582     Dated October 8, 1974

Inventor(s)    Tomio OKADA

It is certified that error appears in the above-identified patent and that said Letters Patent are hereby corrected as shown below:

In the Heading, insert patentee's Claim for Priority as follows:

-- Claims priority, application Japan, No. 46-69766/71, filed September 10, 1971. --

Signed and sealed this 28th day of January 1975.

(SEAL)
Attest:

McCOY M. GIBSON JR.
Attesting Officer

C. MARSHALL DANN
Commissioner of Patents